(12) United States Patent
Ito et al.

(10) Patent No.: US 6,818,400 B2
(45) Date of Patent: Nov. 16, 2004

(54) PROCESS FOR PRODUCING BIOCHIP

(75) Inventors: Toshiaki Ito, Kanagawa (JP); Kenji Yamamoto, Kanagawa (JP); Junji Yoshii, Kanagawa (JP); Atsumi Tsujimoto, Kanagawa (JP); Hisanori Nasu, Kanagawa (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 0 days.

(21) Appl. No.: 09/848,771

(22) Filed: May 3, 2001

(65) Prior Publication Data

US 2002/0012935 A1 Jan. 31, 2002

(30) Foreign Application Priority Data

May 17, 2000 (JP) ........................................ 2000-145099

(51) Int. Cl.[7] .......................... C12Q 1/68; C12M 1/00; C07H 21/04; G01N 15/06
(52) U.S. Cl. .......................... 435/6; 435/7.1; 435/91.1; 435/283.1; 435/287.2; 536/23.1; 536/24.3; 530/300; 422/68.1; 422/100
(58) Field of Search ..................... 435/6, 91.1, 287.2, 435/7.1, 283.1; 536/24.3, 23.1; 530/300; 422/68.1, 100

(56) References Cited

U.S. PATENT DOCUMENTS

| | | | | |
|---|---|---|---|---|
| 4,380,772 A | * | 4/1983 | Italiano | ......................... 347/7 |
| 4,877,745 A | | 10/1989 | Hayes et al. | |
| 5,508,200 A | | 4/1996 | Tiffany et al. | |
| 5,552,087 A | * | 9/1996 | Zeheb et al. | ............. 252/408.1 |
| 6,027,890 A | * | 2/2000 | Ness et al. | |
| 6,083,763 A | * | 7/2000 | Balch | ......................... 436/518 |
| 6,365,378 B1 | * | 4/2002 | Hirota et al. | |
| 6,656,432 B1 | | 12/2003 | Hirota et al. | |

FOREIGN PATENT DOCUMENTS

| | | |
|---|---|---|
| WO | WO 98/45205 | 4/1998 |
| WO | 0 947 819 A2 | 3/1999 |
| WO | WO 00/45955 | 2/2000 |

OTHER PUBLICATIONS

GeneAmp DNA Amplification Reagent Kit, Perkin Elmer Cetus, Oct. 17, 1988.*

* cited by examiner

Primary Examiner—B J Forman
(74) Attorney, Agent, or Firm—Reed Smith LLP; Stanley P. Fisher, Esq.; Juan Carlos A. Marquez, Esq.

(57) ABSTRACT

The present invention aims at producing a biochip by an inkjet system without wasting a DNA solution.

A biochip-producing solution is prepared to contain a combination of a DNA solution 6 to be spotted on a plate 5 and a low-cost buffer solution 7 to be remained in the device after the production. The buffer solution 7 used has a different specific gravity from that of the DNA solution 6 and thus is not mixed therewith.

6 Claims, 8 Drawing Sheets

Prior Art

Fig. 7

Prior Art

PROCESS FOR PRODUCING BIOCHIP

FIELD OF THE INVENTION

The present invention relates to a process for producing a biochip, a substrate immobilized with a biopolymer such as DNA or a protein. More particularly, the present invention relates to a process for producing a biochip by an inkjet system, and a biochip-producing solution used in the process.

BACKGROUND OF THE INVENTION

Biochips are substrates such as glass plates which are immobilized with biopolymers such as DNAs or proteins. According to a process for producing a biochip by an inkjet system, an inkjet device used for an inkjet printer is filled with a biopolymer solution for producing a biochip (a biochip-producing solution) instead of ink, to inject the biochip-producing solution on a substrate to spot a biopolymer on the substrate.

Figure 7:
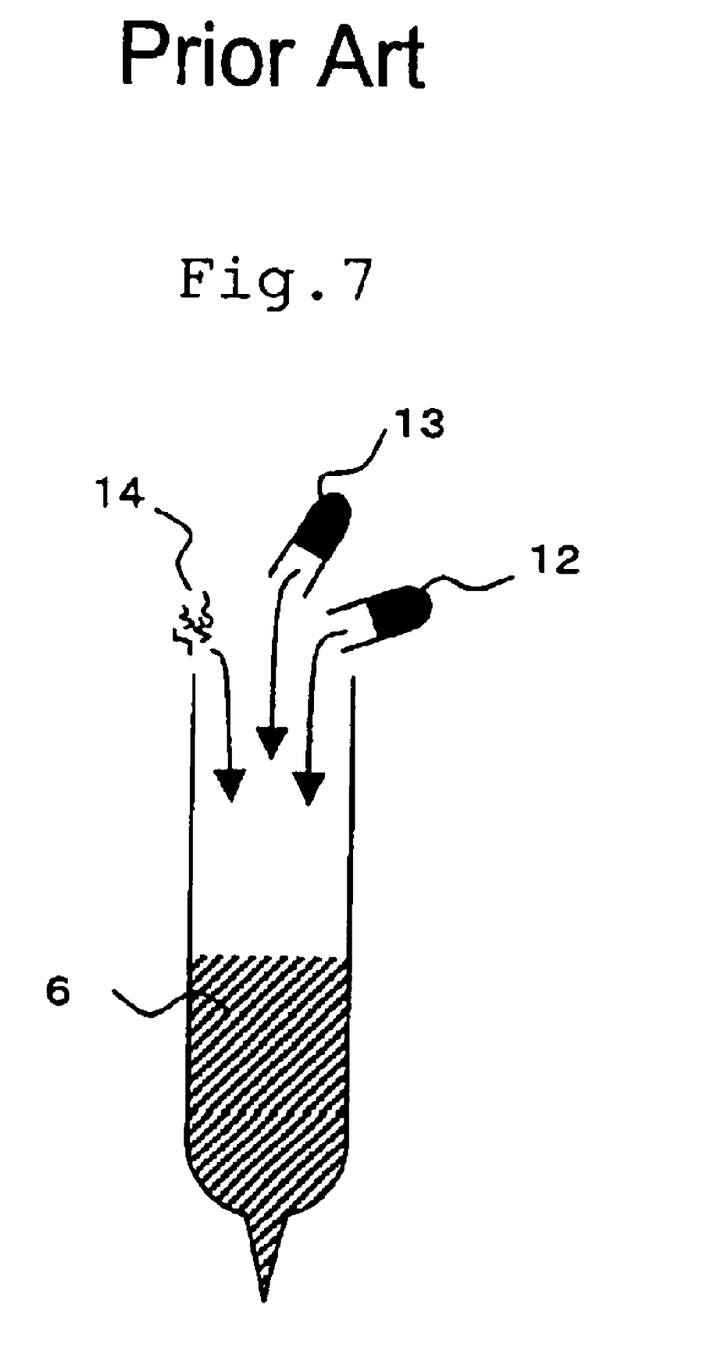
FIG. 7 is an illustration of a biochip-producing solution.

Referring to FIG. 7, the biochip-producing solution used is a DNA solution 6 containing a mixture of Tris-HCl buffer 12, EDTA chelating agent 13 and DNA 14.

Figure 8A:
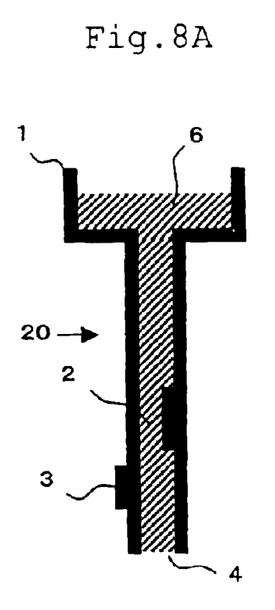
FIGS. 8A to 8C are cross-sectional views for illustrating a conventional process of producing a biochip.
Figure 8B:
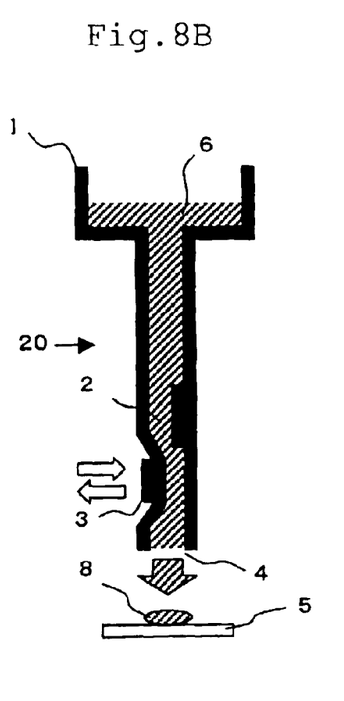
Figure 8C:
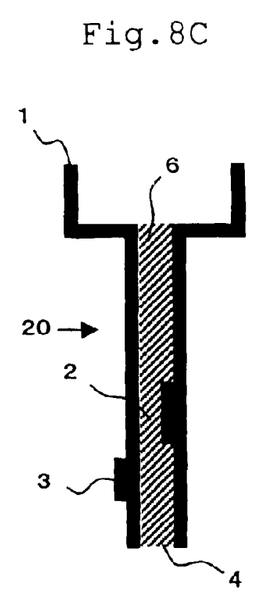

FIGS. 8A to 8C are cross-sectional views for illustrating a process for producing a biochip with an inkjet device using a piezoelectric element. Hereinafter, states of the DNA solution in the inkjet device will be described with reference to FIGS. 8A to 8C. FIG. 8A shows an initial state where a tank 1 of the inkjet device 20 is filled with the DNA solution 6 as the biochip-producing solution. The DNA solution 6 is in the tank 1 and a charging path 2 of the inkjet device 20. FIG. 8B shows a state where the DNA solution 6 is injected on a plate 5. Specifically, a voltage is applied to a piezoelectric element 3 to compress the charging path 2, by which the DNA solution 6 is pushed and injected out from an injection nozzle 4 to deposit a DNA spot 8 on a plate 5 to immobilize DNA thereon. Then, the voltage applied to the piezoelectric element 3 is reduced to release the compression stress on the charging path 2 to restore the charging path 2 from the compressed state to the normal state. This operation is repeated for subsequent plates, thereby producing a plurality of biochips.

FIG. 8C shows the ending state of the injection of the DNA solution caused by a shortage of the solution. In this state, the DNA solution 6 is remaining in the tank 1 and the charging path 2 of the inkjet device 20. According to the inkjet system, the DNA solution 6 may not be injected even when it is remaining in the device because an insufficient amount of solution in the tank 1 does not produce a pressure necessary for injection from the injection nozzle 4 upon compression of the charging path 2. As a result, the injection is terminated with the DNA solution 6 remaining in the tank 1 and the charging path 2.

As described above, according to production of a biochip with an inkjet device, not the entire amount of the biochip-producing solution in the tank is used for producing the biochip. Since the biochip production terminates with the biochip-producing solution remaining in the inkjet device, the remaining biochip-producing solution will be disposed. Thus, the amount of the biochip-producing solution required in total includes an amount to be spotted on substrates and an amount that will remain in the device, which means that more than the amount of DNA solution used for spotting is necessary. For example, in order to produce 10,000 biochips with DNA spot of 0.2 nl (nanoliter), a total of 52 $\mu$l (microliters) of DNA solution is necessary including 2 $\mu$l for the 10,000 DNA spots and 50 $\mu$l for the DNA solution to be remained in the inkjet device and disposed. According to such a conventional process, a great portion of an expensive DNA solution prepared for biochip production is unused and disposed, increasing the cost of biochips. This problem is not only the case of the inkjet system using a piezoelectric element, but it is also a problem of all types of biochip-producing devices which ejects a DNA solution on a substrate, such as an inkjet system that injects the solution by causing bubbles by heating with a heater, and an electrostatic plotter.

In view of such conventional art problem, the present invention has an objective of providing a process for producing a biochip by an inkjet system or an electrostatic plotter system, which can use a biochip-producing solution containing biopolymers such as expensive DNA without wasting it. The present invention also has an objective of providing a biochip-producing solution preferable to be used for producing a biochip by an inkjet system or an electrostatic plotter system.

SUMMARY OF THE INVENTION

The present invention accomplishes the above-mentioned objective by using a less expensive buffer solution as a solution to be remained in the inkjet-type or electrostatic-plotter-type biochip-producing device after the production. Thus, a biochip-producing solution contains a combination of a biopolymer solution such as DNA to be spotted on a substrate and a buffer solution to be remained in the device after the production. The buffer solution used has a different specific gravity from that of the biopolymer solution and thus is not mixed therewith.

By using the biochip-producing solution containing a combination of the biopolymer solution and the buffer solution, the amount of the biopolymer solution to be injected into the biochip-producing device can be reduced to a minimum amount. For example, in order to produce 10,000 biochips, the conventional inkjet system required 52 $\mu$l of the DNA solution to spot 2 $\mu$l of it on substrates plus 50 $\mu$l of it to remain in the device. On the other hand, the present invention requires only 2 $\mu$l of the DNA solution as the solution to be spotted on substrates (by replacing the 50 $\mu$l of the DNA solution to be remained in the device with the buffer solution), thereby greatly reducing the amount of the DNA solution to be prepared. Since the expensive DNA solution is not wasted, great cost reduction can be realized.

According to one aspect of the invention, a biochip-producing solution comprises a first solution containing a biopolymer and a second solution having a different specific gravity from that of the first solution so that the second solution is not mixed with the first solution.

According to another aspect of the invention, a biochip-producing solution of the invention comprises a first solution containing a biopolymer and a second solution having a specific gravity lower than that of the first solution so that the second solution is not mixed with the first solution.

According to yet another aspect of the invention, a biochip-producing solution comprises a first solution containing a biopolymer, a second solution having a specific gravity lower than that of the first solution so that the second solution is not mixed with the first solution, and a third solution having a specific gravity higher than that of the first solution so that the third solution is not mixed with the first solution.

A process for producing a biochip according to the present invention comprises: putting a biochip-producing solution containing a biopolymer into an inkjet device; and injecting the biochip-producing solution from the inkjet device to a substrate to immobilize a spot of the biopolymer on the substrate, wherein the biochip-producing solution contains a first solution containing a biopolymer and a second solution having a different specific gravity from that of the first solution so that the second solution is not mixed with the first solution.

A specific gravity of a buffer solution, which is different from that of a solution containing a biopolymer (e.g., a DNA solution) is selected such that the DNA solution stays at an injected solution side followed by the buffer solution. For example, when the solution is injected downwardly from a higher place, the specific gravity of the buffer solution is lower than that of the DNA solution so that the buffer solution stays above the DNA solution. On the other hand, when the solution is injected upwardly from a lower place, the specific gravity of the buffer solution is higher than that of the DNA solution so that the buffer solution stays under the DNA solution.

DETAILED DESCRIPTION OF THE INVENTION

Hereinafter, embodiments of the present invention will be described with reference to the attached drawings.

A biochip is a plate (substrate) made of, for example, glass that is spotted with a biopolymer such as DNA. An inkjet-type biochip-producing system utilizes an inkjet device for spotting the biopolymer onto the plate and a biochip-producing solution containing the biopolymer. Herein, for convenience sake, DNA is used as the biopolymer.

Figure 1:
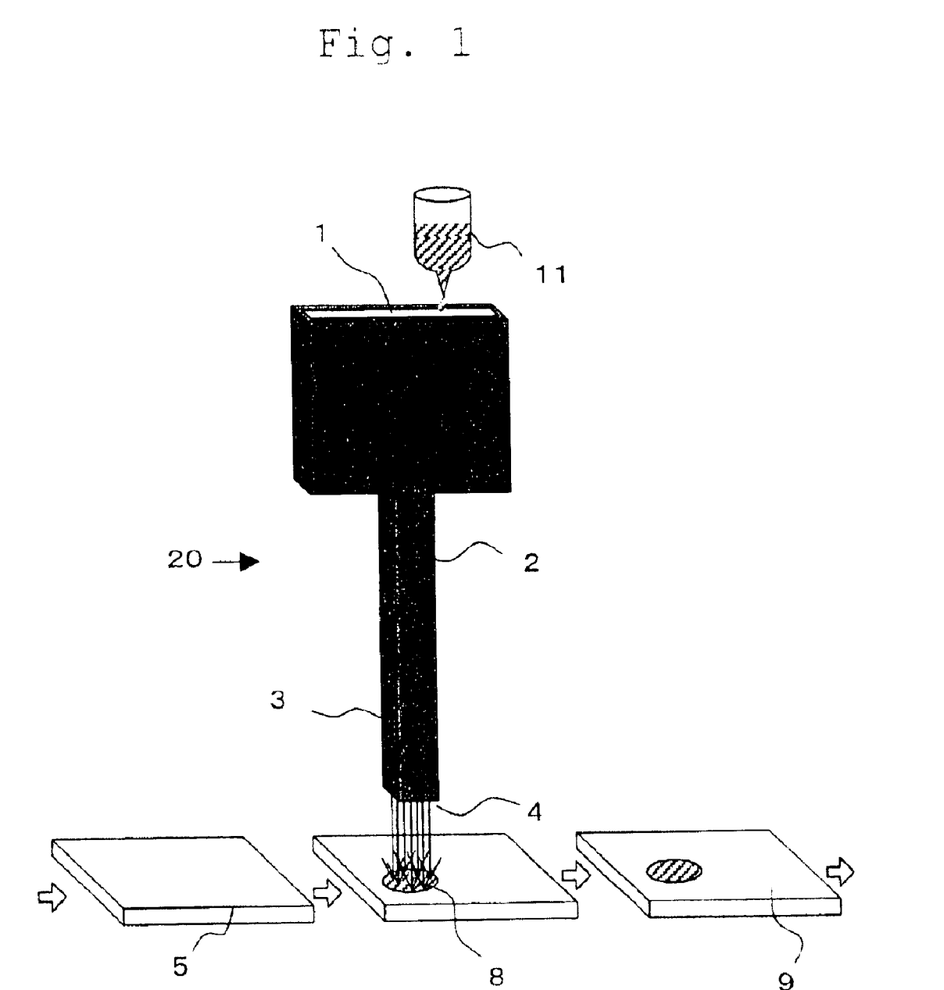
FIG. 1 is a structure view of a device for carrying out a process for producing a biochip according to the present invention.

FIG. 1 is a structure view of a device for carrying out a process for producing a biochip according to the present invention. Instead of ink, a biochip-producing solution 11 is put into an inkjet device 20 and injected therefrom to form a DNA spot 8 on a surface of a plate 5, thereby preparing a biochip 9. The principle here is the same as that of conventional processes. The biochip-producing solution 11 is put into a tank 1 of the inkjet device 20 to fill a charging path 2 to an injection nozzle 4. At this point, the biochip-producing solution 11 is in the tank 1 and the charging path 2 of the inkjet device 20. Then, the charging path 2 is compressed with a piezoelectric element 3 provided on the charging path 2, whereby the biochip-producing solution is injected from the injection nozzle 4 to form the DNA spot 8 on the plate 5. Thus, the biochip 9 is produced.

EXAMPLE 1

Figure 2:
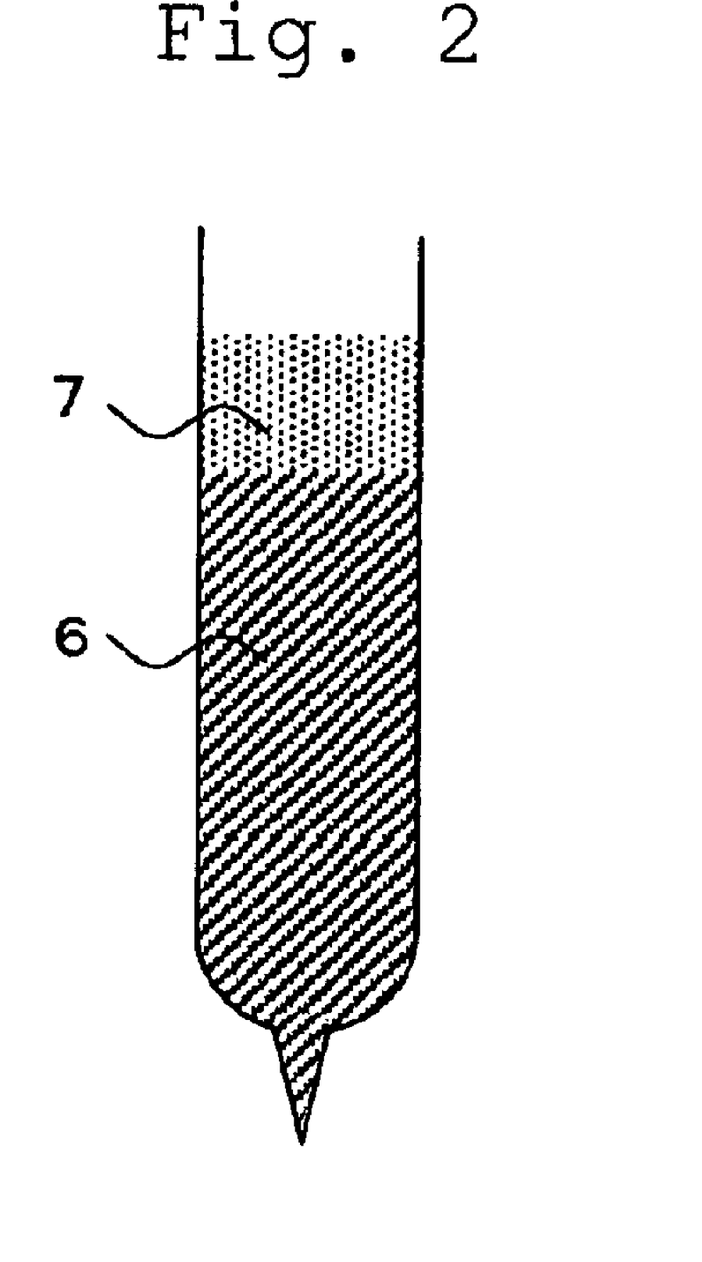
FIG. 2 is a schematic view showing an example of a composition of a biochip-producing solution of the invention.

FIG. 2 is a schematic view showing an example of a composition of a biochip-producing solution of the invention. The biochip-producing solution contains a DNA solution 6 and a buffer solution 7. The DNA solution 6 contains Tris-HCl as a buffer, EDTA as a chelating agent and DNA to be spotted onto a plate. The buffer solution 7 is liquid paraffin (specific gravity: 0.83 to 0.86) or a mineral oil (specific gravity: 0.84 to 0.88) whose specific gravity is lower than that of the DNA solution 6 (specific gravity: about 1.0) so that it is not mixed with the DNA solution 6.

Figure 3A:
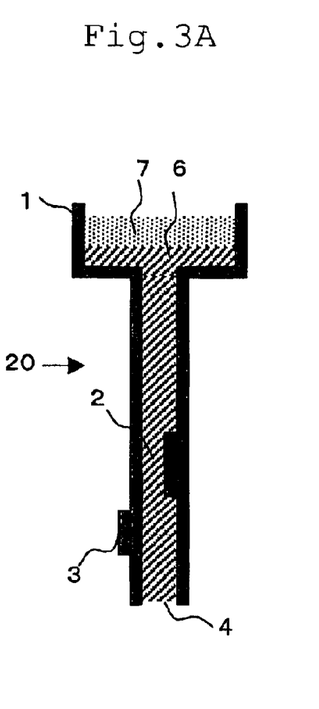
FIGS. 3A to 3C are schematic views for illustrating a process for producing a biochip by an inkjet system using the biochip-producing solution shown in FIG. 2.
Figures 3B, 3C:
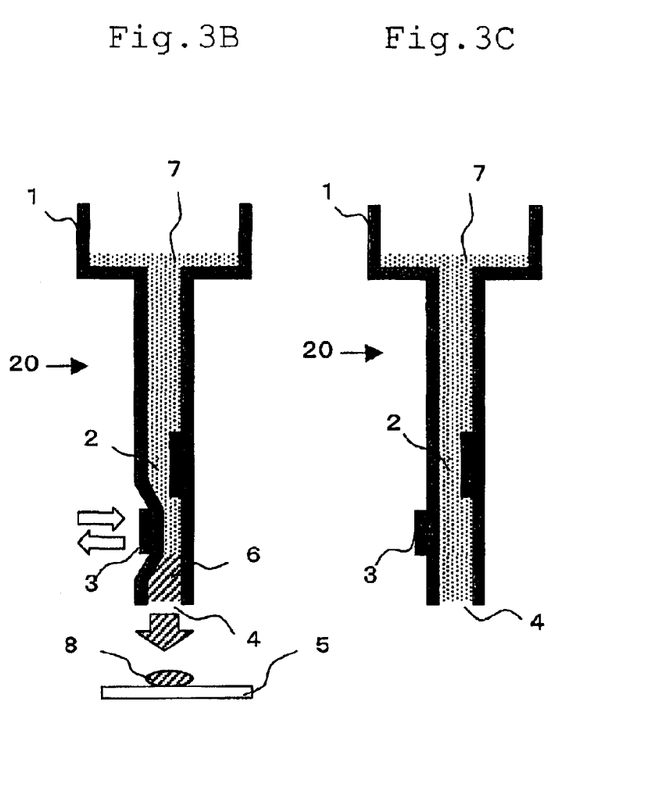

FIGS. 3A to 3C are schematic views for illustrating a process for producing a biochip by an inkjet system using the biochip-producing solution shown in FIG. 2.

FIG. 3A shows an initial state where the biochip-producing solution shown in FIG. 2 is put into the tank 1 of the inkjet device 20. At this state, two types of solutions 6 and 7 with different specific gravities (i.e., the DNA solution 6 and the buffer solution 7) are separately contained in the biochip-producing solution. Preferably, the solutions prepared in separate containers are put one after another into the tank 1 from the solution with higher specific gravity (i.e., first the DNA solution 6 and then the buffer solution 7) rather than putting the solutions together into the tank 1, so that the solutions are mixed as minimum as possible upon putting into the tank 1.

FIG. 3B is a schematic view showing a state where a biochip is produced. The plate 5 is placed beneath the injection nozzle 4 of the inkjet device 20, and the DNA solution 6 is injected to spot DNA onto the plate 5. Since the specific gravity of the DNA solution 6 is higher than that of the buffer solution 7, the DNA solution stays closer to the injection nozzle 4 while the buffer solution 7 stays closer to the tank 1 separate from the DNA solution. As a result, the DNA solution 6 can be used first.

In order to inject the DNA solution 6, the charging path 2 is compressed by applying a voltage to the piezoelectric element 3, by which pressure is applied on the charging path 2 and transmitted from the piezoelectric element 3 toward the tank 1 and the injection nozzle 4. Since the force transfers to a place with low pressure, the DNA solution 6 can be injected from the injection nozzle 4 by keeping the pressure toward the tank 1 greater than that toward the injection nozzle 4. Thereafter, the voltage applied to the piezoelectric element 3 is reduced to release the compression stress on the charging path 2 to restore the charging path 2 from the compressed state to the normal state. As a result, a suction force is caused by the release of the compression, whereby the DNA solution 6 in the tank 1 with higher pressure is supplied to the charging path 2. When a plurality of biochips are to be produced, the plate 5 spotted with the DNA solution 6 is sent over and the next plate 5 is placed under the injection nozzle 4. By repeating this step, a plurality of biochips can be produced.

FIG. 3C shows a state where the entire amount of the DNA solution 6 is used. At this point, the buffer solution 7 is remaining in the charging path 2 and the tank 1 of the inkjet device 20. Accordingly, the entire amount of the DNA solution 6 can be spotted on the plates without being wasted.

EXAMPLE 2

Figure 4:
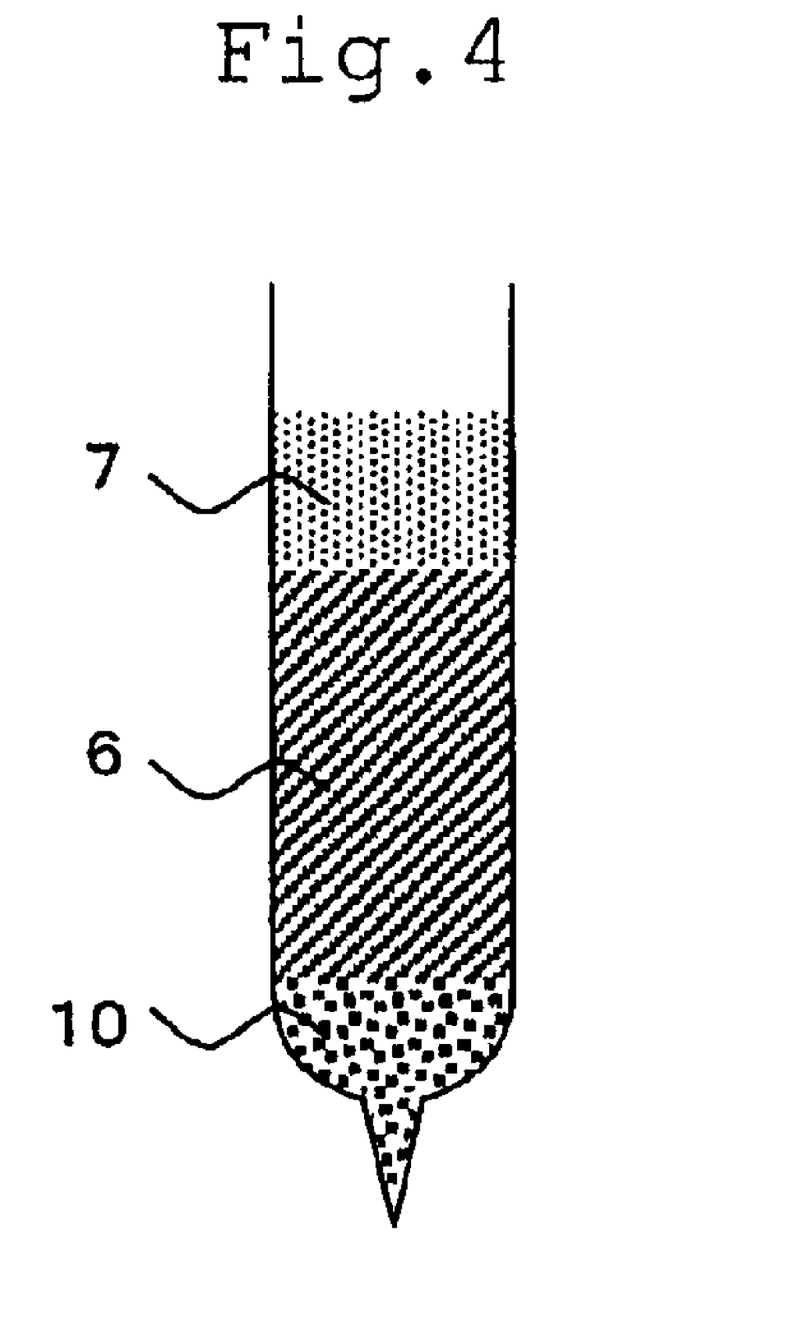
FIG. 4 is a schematic view showing another exemplary composition of a biochip-producing solution of the invention.

FIG. 4 is a schematic view showing another exemplary composition of a biochip-producing solution of the invention. This biochip-producing solution is useful when a test injection is necessary for initial adjustment of the inkjet device, which is performed until the injection operation becomes stable.

The biochip-producing solution contains a DNA solution 6, a buffer solution 7 and an initial adjustment solution 10. The DNA solution 6 contains Tris-HCl as a buffer, EDTA as a chelating agent and DNA to be spotted onto a plate. The buffer solution 7 used is liquid paraffin (specific gravity: 0.83 to 0.86) or a mineral oil (specific gravity: 0.84 to 0.88) whose specific gravity is lower than that of the DNA solution 6 (specific gravity: about 1.0) so that it is not mixed with the DNA solution 6. The initial adjustment solution 10 used is glycerol (specific gravity: about 1.26) or chloroform (specific gravity: about 1.48) whose specific gravity is higher than that of the DNA solution 6.

FIGS. 5A to 5D are schematic views for illustrating an inkjet-type biochip-producing process using the biochip-producing solution shown in FIG. 4.

Figure 5A:
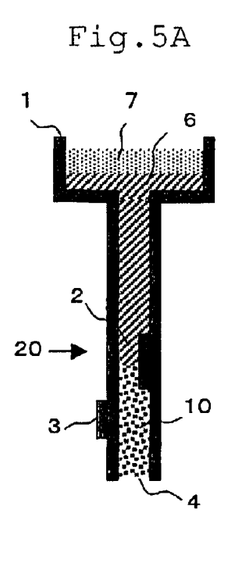
FIGS. 5A to 5D are schematic views for illustrating an inkjet-type biochip-producing process using the biochip-producing solution shown in FIG. 4.

FIG. 5A is a schematic view showing an initial state where the biochip-producing solution shown in FIG. 4 is put into the tank 1 of the inkjet device 20. Three types of solutions 10, 6 and 7 with different specific gravities are separately contained in the biochip-producing solution. The charging path 2 is filled with the solutions in the order of higher specific gravity where the buffer solution 7 with the lowest specific gravity staying at the top of the biochip-producing solution. Specifically, the charging path 2 is filled with the solutions such that the initial adjustment solution 10 stays closer to the injection nozzle 4, the DNA solution 6 in the middle, and the buffer solution 7 on the top. Preferably, the solutions prepared in separate containers are put one after another into the tank 1 from the solution with higher specific gravity (i.e., first the initial adjustment solution 10, then the DNA solution 6 and finally the buffer solution 7) rather than putting the solutions together into the tank 1, so that the solutions are mixed as minimum as possible upon putting into the tank 1.

Figures 5B, 5C, 5D:
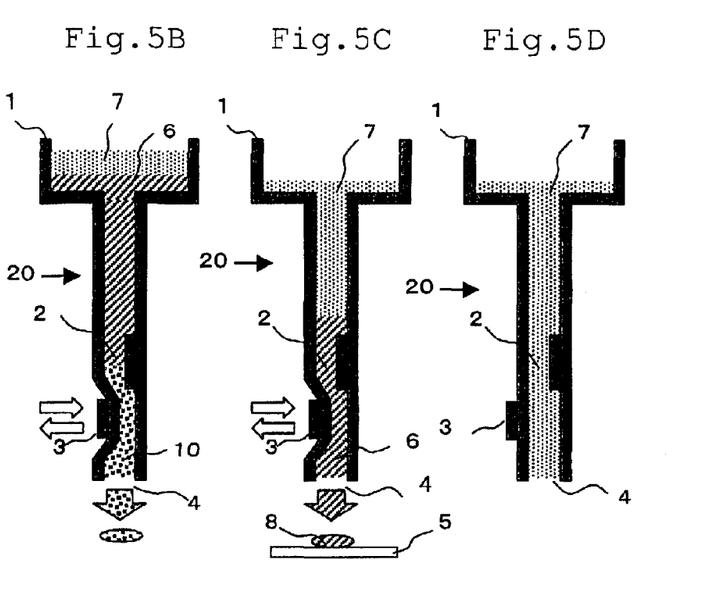

FIG. 5B is a schematic view showing an initial adjustment state which is performed until the injection operation by the inkjet device becomes stable. The solution is repeatedly injected until the amount of injection becomes stable. Since the solution injected from the injection nozzle 4 is the initial adjustment solution 10, there is no need of using the DNA solution 6.

FIG. 5C is a schematic view showing a state where a biochip is produced. After injecting the entire amount of the initial adjustment solution 10 so that the DNA solution 6 is now injected from the injection nozzle 4, a plate 5 is placed under the injection nozzle 4 of the inkjet device 20. Then, the DNA solution 6 is injected for producing the biochip. Since the specific gravity of the DNA solution 6 is higher than that of the buffer solution 7, the DNA solution stays closer to the injection nozzle 4 while the buffer solution 7 stays closer to the tank 1 separate from the DNA solution 6. As a result, the DNA solution 6 can be used first.

FIG. 5D is a schematic view showing a state where the entire amount of the DNA solution 6 is used. At this point, the buffer solution 7 is remaining in the charging path 2 and the tank 1 of the inkjet device 20. Accordingly, the entire amount of DNA solution 6 can be spotted on the plates 5 without wastefully remaining in the inkjet device.

EXAMPLE 3

Figure 6:
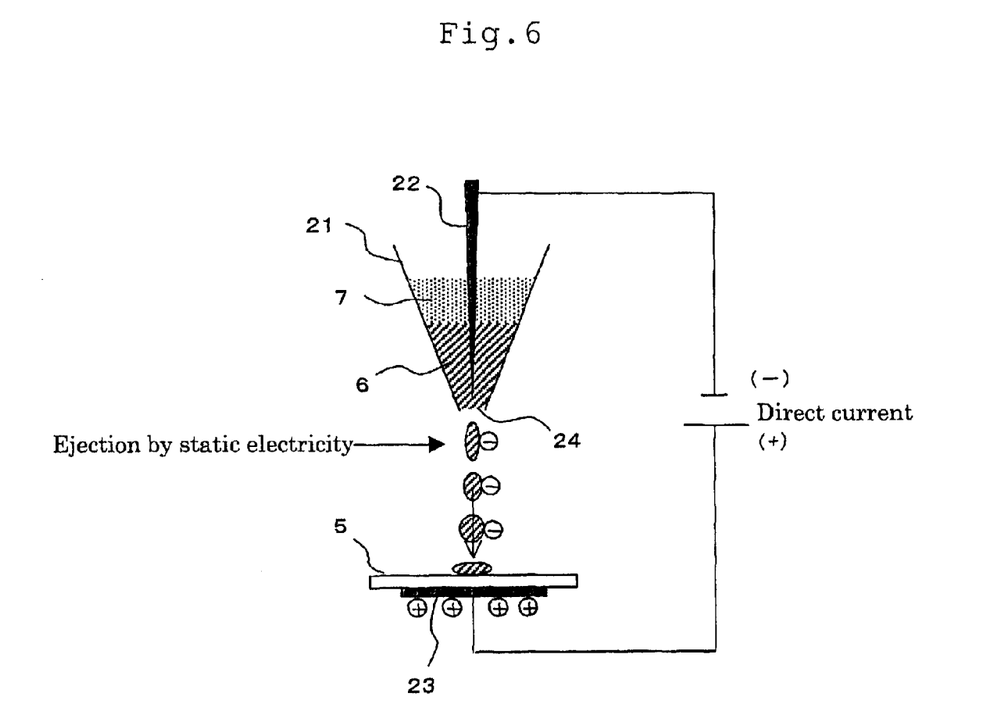
FIG. 6 is a schematic view for illustrating an electrostatic-plotter-type biochip-producing process using the biochip-producing solution shown in FIG. 2.

FIG. 6 is a schematic view for illustrating an electrostatic-plotter-type biochip-producing process using the biochip-producing solution shown in FIG. 2.

An electrostatic-plotter-type biochip-producing device is provided with a tank 21 mounted with a cathode-side discharge pin 22 and an anode plate 23. The biochip-producing solution containing the DNA solution 6 and the buffer solution 7 is put into the tank 21 and a plate 5 is placed on the anode plate 23. The DNA solution 6 with higher specific gravity will stay at a lower position in the tank 21 closer to a nozzle 24 while the buffer solution 7 with lower specific gravity separately stays at an upper position.

In order to deposit the DNA solution on a plate 5, a voltage is applied between the cathode-side discharge pin 22 and the anode plate 23. As a result, static electricity is caused from the cathode-side discharge pin 22 to the anode plate 23, by which the DNA solution is ejected from the nozzle 24 towards the anode plate 23. Thus, the DNA solution can be deposited on the plate 5. The DNA solution 6 is also effectively used in this electrostatic-plotter-type biochip-producing process compared to the conventional processes.

As described above, by using the biochip-producing solution of the invention, an entire amount of a DNA solution containing expensive DNA can be deposited on biochips without being wasted. Although the biochip-producing solutions described herein contained DNA as the biopolymer, the present invention is also applicable to producing biochips immobilized with biopolymers other than DNA (e.g., a protein chip). The present invention is not limited to the inkjet system or the electrostatic plotter system, and is also applicable to any system that produces biochips by depositing a biopolymer solution on media.

According to the present invention, a biochip can be produced by an inkjet system, an electrostatic plotter system or the like by effectively using a DNA solution containing expensive DNA without wasting it.

What is claimed is:

1. A process for producing at least one biochip, comprising:

putting a first solution containing at least one biopolymer, a second solution which gravity is smaller than the gravity of the first solution so as not to mix with the first solution, and an initial adjustment solution which does not mix with the first solution and has a larger specific gravity than that of the first solution into an inkjet device;

repeatedly ejecting the initial adjustment solution until an ejection amount of the inkjet device becomes stable and the initial adjustment solution is used up; and ejecting the first solution from the inkjet device to a substrate to immobilize the biopolymer on a spot of a substrate of said biochip thereby producing said biochip.

2. The process for producing at least one biochip according to claim 1, wherein the ejecting step includes repeatedly replacing one of said biochip placed underneath an ejecting head of the inkjet device and ejected with the first solution with another of said biochip so as to produce a plurality of biochips.

3. The process for producing at least one biochip according to claim 1, wherein the putting step includes putting the first solution into the inkjet device prior to putting the second solution into the inkjet device.

4. A process for producing a biochip by spotting a biopolymer on a plate by using an inkjet apparatus comprising a tank containing a solution, a supply passage connected to the tank, and means for ejecting the solution from a tip of the supply passage, the method comprising:

a first step of injecting into the tank and supply passage of the inkjet apparatus a biochip-producing solution comprising a first solution containing the biopolymer, a second solution which does not mix with the first solution and that has a smaller specific gravity than that of the first solution, and an initial adjustment solution which does not mix with the first solution and has a larger specific gravity than that of the first solution to fill at least the supply passage;

a second step of repeatedly ejecting the initial adjustment solution from the inkjet apparatus until an ejection amount of the tip becomes stable and the initial adjustment solution is used up;

a third step of ejecting the first solution from the inkjet apparatus such that the biopolymer is spotted at a predetermined location on the plate positioned below an ejection opening of the inkjet; and a fourth step of delivering the plate on which the biopolymer was spotted and transporting the next plate below the ejection opening, wherein the biopolymer is spotted on a plurality of plates by repeating she third and fourth steps.

5. The process for producing at least one biochip according to claim 1, wherein the first solution contains Tris-HCl as a buffer.

6. The process for producing at least one biochip according to claim 1, wherein a the second solution is liquid paraffin or mineral oil.

* * * * *